June 6, 1939. M. CARTER 2,161,281
PROCESS FOR PRODUCING MOLDED RUBBER ARTICLES
Filed April 30, 1936
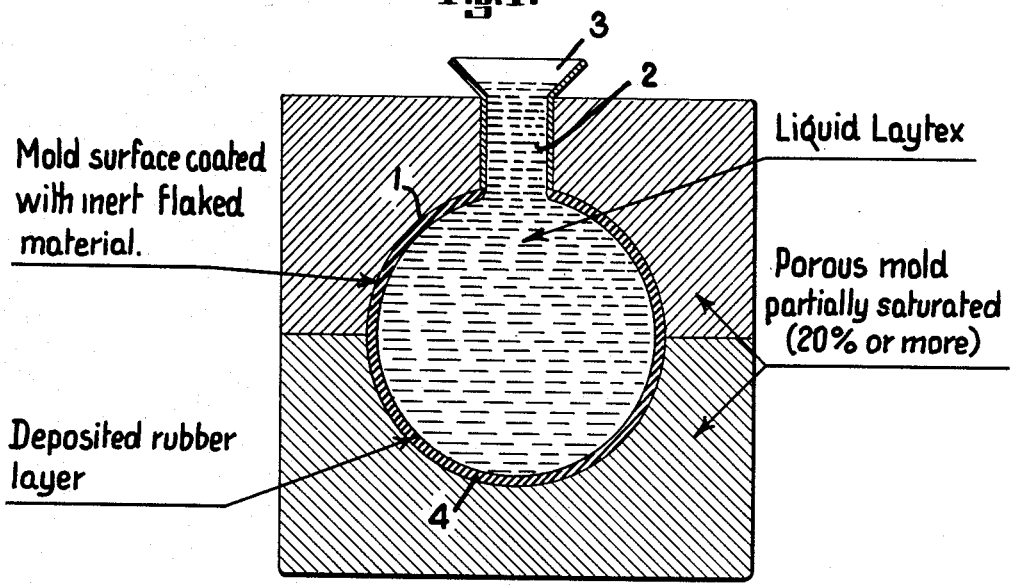
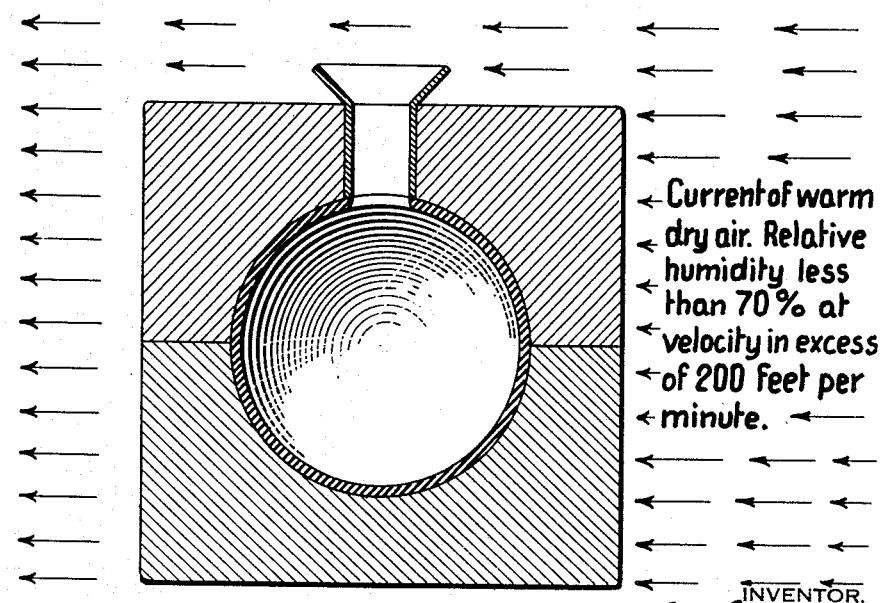
INVENTOR.
Mitchell Carter
BY Emery, Varney, Whittemore & Dix
ATTORNEYS.

Patented June 6, 1939

2,161,281

UNITED STATES PATENT OFFICE 2,161,281

PROCESS FOR PRODUCING MOLDED RUBBER ARTICLES

Mitchell Carter, Trenton, N. J., assignor, by mesne assignments, to Rubber Products, Inc., Chicago, Ill., a corporation of Illinois Application April 30, 1936, Serial No. 77,146

9 Claims. (Cl. 18—58)

This invention relates to the production of rubber articles from liquid latex by causing the rubber particles in the latex to be deposited on the walls of a porous mold while the water contained in the latex passes through the pores thereof.

It has long been known that rubber articles could be produced in this manner, but such processes have been used commercially only to a very limited extent because of certain difficulties which have been experienced in producing useful commercial articles. Among these difficulties may be mentioned (1) the tendency of the molded article to adhere to the surfaces of the mold, causing rapid deterioration and destruction of the mold, (2) the tendency of the rubber solids of the latex to form an impervious layer on the surface of the mold which retarded or prevented the passage of water, (3) the tendency toward the formation of air bubbles between the surfaces of the mold and the latex, causing a rough or "honeycombed" structure in the molded article, and (4) the tendency of the molded article, and particularly of a hollow article, to sag away from the surface of the mold, thus deforming the article.

It is an object of the present invention to provide a process for molding rubber articles from liquid latex in porous molds which shall be commercially practical, and which shall eliminate, among others, the difficulties above mentioned.

A preferred embodiment of the invention selected for purposes of illustration is shown in the accompanying drawing, in which, Figure 1 is a vertical section through a mold as it appears during the depositing stage of the process.

Figure 2 is a similar view as it appears during the drying stage of the process.

As far as I am aware, all prior processes for molding rubber articles from liquid latex in porous molds have used dry molds or forms and have relied upon the absorption of water into the dry porous material to build up the layer of rubber. I have discovered that this procedure is one of the causes of the difficulties which have been experienced, for in a dry mold, the first rubber deposited tends to form an impervious layer which retards, or in some cases, as with pure or substantially pure latex, prevents the passage of additional water, thus limiting the thickness of the layer which can be formed. Furthermore, in a dry mold the pores of the mold material are filled with air, and when the absorption of water begins, some of the air in the pores is displaced toward the inner surface of the mold where it breaks through the surface of the article being formed, thus producing the rough or "honeycombed" structure in the molded article referred to above.

In order to overcome this difficulty, I propose to start with a wet mold, that is, one containing a substantial quantity of the liquid which is used as the continuous phase or carrying agent for the solids to be deposited. Such, for example, as the use of water for wetting the mold when using a waterbase dispersion of rubber or so-called "latex." The mold may even be saturated with water, but inasmuch as a saturated mold becomes somewhat soft and is apt to be damaged in handling, in practice I use only partially saturated molds. I find that it is satisfactory if the mold is 20% or more saturated, but I prefer to use a mold which is approximately 30% saturated. By saturated, I mean a mold which is so completely filled with water that it will not absorb additional water, and by 20% saturated, I mean a mold which contains 20% of the water which it will hold when completely saturated.

Shortly before the molds are used, I prepare the mold surfaces 1, in order to prevent the latex from adhering thereto, by coating them with a thin layer of inert protective material. This treatment protects the mold surfaces and greatly prolongs the useful life of the molds. For this purpose, I prefer to use flaked material such as powdered mica, in which the size of the flakes is sufficient to cover the pores of the mold and prevent the entrance of solid rubber particles into the pores of the mold, but permitting flow of liquid therethrough. The preferred method of applying the same is to prepare a suspension of mica in water, using approximately one part mica to 20 parts water. It is desirable, however, to add a small quantity of glycerine to the mixture, approximately 5 parts of glycerine being sufficient. This mixture may be applied to the mold surfaces with a soft brush so as to secure a uniform thin layer. This method of application has the advantage that inasmuch as it is applied immediately before the mold is used, the water more or less completely saturates those portions of the mold nearest to the mold surfaces.

After preparing the molds in this fashion, I pour in liquid latex through an opening 2 sufficient to completely fill the mold, the mold being preferably provided with a chamber 3 of sufficient size to hold a surplus of latex sufficient to keep the mold filled during the entire operation. I then immediately place the same in an air-conditioned chamber in which a warm, dry atmosphere is circulated, and I relay on the evaporation which takes place on the outside surfaces of the mold to withdraw water from the latex within the mold, the rubber particles being separated, of course, to form a layer 4 on the inner surfaces of the mold. The presence of a common agent or ingredient, such as water, in both the mold body and the liquid contained in the mold, assures an even and rapid withdrawal of this common component or menstruum from the body of the cast material or latex and through the body of the mold. Precautions should be taken to prevent pressure above atmospheric pressure from being built up in the chamber, for I have found that such pressures may force moisture back through the mold wall and produce depressions on the surface of the molded articles.

I have found that a relative humidity of less than 70% should be maintained and that the velocity of the air past the molds should be in excess of 200 ft. per minute, in order to secure practical results. If a relative humidity of 50% is maintained and the velocity of the air past the molds is approximately 500 ft. per minute, these conditions are adequate to cause evaporation at the surface of the mold approximately equal to the maximum rate of passage of moisture through the mold wall.

As soon as a layer of rubber of the desired thickness has been accumulated, the mold is removed from the chamber and the liquid latex remaining in the mold is poured out. The mold is then returned to the chamber until the articles are dry enough to handle or when the moisture content of the articles is less than 15%. Preferably the drying period should be approximately the same length as the forming period, that is, if the forming period is one-half hour, the drying period should also be approximately one-half hour under the same conditions of temperature, humidity, air flow and pressure.

At the end of the drying period the articles are removed from the molds and are then further dried slowly by allowing them to stand until the moisture content is approximately 10%. The articles are then placed in a curing chamber and are cured for whatever period may be necessary depending upon the particular vulcanizing and accelerating agents employed. In case so-called pre-vulcanized latex is used, no curing is necessary. After the article is removed from the mold, the mold is usually in perfect condition as to moisture content for refilling for another molding operation, as it is found that they then contain more than 20% moisture. It will be understood, however, that the inner mold surfaces should be re-treated with the suspension of powdered mica previously referred to, for much of the mica previously applied will be removed when the molded article is removed. Thus the molds may ordinarily be used continuously over and over again without either drying or moistening. When so used, the articles formed therein will be uniform in thickness and weight when submitted to similar conditions for similar periods of time.

It will be understood that in the foregoing specification where I have referred to the production of articles from liquid latex, I include within the term liquid latex various liquid mixtures formed by adding to pure latex various usual compounding ingredients such as fillers, weighting ingredients, coloring matter and the like, and the usual vulcanizing and accelerating agents, the mixture being maintained in liquid condition by the addition of sufficient water to maintain a creamy consistency. I also include other dispersions of rubber in liquid. In the practice of my process I am able to produce satisfactory rubber articles from mixtures of various kinds, ranging from substantially pure liquid latex to latex which has been compounded with large quantities of compounding ingredients.

It will be understood that the invention may be variously modified and embodied within the scope of the subjoined claims.

I claim as my invention:

1. Process of producing molded rubber articles from dispersions of rubber in a liquid menstruum which comprises introducing said dispersion into a porous mold which is more than 20% saturated with a liquid having substantially the same properties as the said liquid menstruum, and causing evaporation to take place at the outer surfaces of said mold until a rubber layer of the desired thickness has been formed.

2. Process of producing molded rubber articles from liquid latex which comprises introducing liquid latex into a porous mold which is more than 20% saturated with water, causing evaporation to take place at the outer surfaces of said mold until a rubber layer of the desired thickness has been formed, removing the excess liquid latex, and causing additional evaporation to take place at the outer surfaces of said mold to partially dry the article.

3. Process of producing molded rubber articles from liquid latex which comprises introducing liquid latex into a porous mold which is more than 20% saturated with water, causing evaporation to take place at the outer surfaces of said mold until a rubber layer of the desired thickness has been formed, removing the excess liquid latex, causing additional evaporation to take place at the outer surfaces of said mold to partially dry the article, removing the articles from the mold, drying them until the moisture content is 10% or less, and curing the articles.

4. Process of producing molded rubber articles from liquid latex which comprises introducing liquid latex into a porous mold which is more than 20% saturated with water, causing evaporation to take place at the outer surfaces of said mold until a rubber layer of the desired thickness has been formed, removing the excess liquid latex, causing additional evaporation to take place at the outer surfaces of said mold to partially dry the article, removing the articles from the mold and refilling the mold while still moist.

5. Process of producing molded rubber articles from liquid latex which comprises introducing liquid latex into a porous mold which is more than 20% saturated with water, and causing evaporation to take place at the outer surfaces of said mold until a rubber layer of the desired thickness has been formed.

6. Process of producing molded rubber articles from liquid latex which comprises introducing liquid latex into a porous mold which is more than 20% saturated with water, causing evaporation to take place at the outer surfaces of said mold until a rubber layer of the desired thickness has been formed, removing the excess liquid latex, and causing additional evaporation to take place until the moisture content of the article is less than 15%.

7. Process of producing molded rubber articles from liquid latex which comprises introducing liquid latex into a porous mold which is more than 20% saturated with water, and moving a current of warm dry air over the outside of said mold to cause evaporation to take place.

8. Process of producing molded rubber articles from liquid latex which comprises introducing liquid latex into a porous mold which is more than 20% saturated with water, and moving a current of air having a relative humidity of less than 70% over the outside of said mold at a velocity in excess of two hundred feet per minute.

9. Process of producing molded rubber articles from liquid latex which comprises coating the surfaces of a porous mold which is partially saturated with water with inert protective material in finely divided flake form, pouring liquid latex into said mold, and causing evaporation to take place at the outer surfaces of said mold until a rubber layer of the desired thickness has been formed.

MITCHELL CARTER.